(12) United States Patent
Tsutsumi et al.

(10) Patent No.: US 7,457,534 B2
(45) Date of Patent: Nov. 25, 2008

(54) INFRARED COMMUNICATION SYSTEM AND INFRARED SIGNAL RECEIVING APPARATUS

(75) Inventors: Katsuyoshi Tsutsumi, Gunma (JP); Akira Yaegashi, Kanagawa (JP); Takahiro Fujimori, Tokyo (JP); Junichi Yanagisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 524 days.

(21) Appl. No.: 11/179,626

(22) Filed: Jul. 13, 2005

(65) Prior Publication Data

US 2006/0024037 A1 Feb. 2, 2006

(30) Foreign Application Priority Data

Jul. 23, 2004 (JP) .......................... P2004-215224

(51) Int. Cl.
*G03B 17/00* (2006.01)
*H04N 5/232* (2006.01)

(52) U.S. Cl. ..................................... 396/58; 348/211.2

(58) Field of Classification Search .................. 396/56, 396/58; 348/211.99, 211.1, 211.2
See application file for complete search history.

(56) References Cited

U.S. PATENT DOCUMENTS

| | | | | |
|---|---|---|---|---|
| 5,223,878 | A | * | 6/1993 | Shintani et al. ................ 396/58 |
| 6,037,721 | A | * | 3/2000 | Lansing et al. .............. 315/295 |
| 2005/0047794 | A1 | * | 3/2005 | Quintanar ................... 398/149 |

* cited by examiner

*Primary Examiner*—W. B. Perkey
*Assistant Examiner*—Rishi S Suthar
(74) *Attorney, Agent, or Firm*—Oblon, Spivak, McClelland, Maier & Neustadt, P.C.

(57) ABSTRACT

An infrared communication system is disclosed, that has a transmitter and a receiver. The transmitter includes a modulator, a first converter, an infrared transmission section. The modulator modulates a first electric signal and generates a second signal as a modulated signal. The first converter converts the second signal into an infrared signal. The infrared transmission section transmits the infrared signal to the receiver. The receiver includes a filter, a second converter, and a demodulator. The filter restrains rays having a spectrum whose peak is present at a predetermined wavelength emitted by a plasma display panel. The second converter converts the infrared signal passed through the filter into a third electric signal. The demodulator demodulates the third electric signal.

11 Claims, 8 Drawing Sheets ered, infrared signals are used. For example, a remote con-
INFRARED COMMUNICATION SYSTEM AND INFRARED SIGNAL RECEIVING APPARATUS

CROSS REFERENCES TO RELATED APPLICATIONS

The present invention contains subject matter related to Japanese Patent Application No. 2004-215224 filed in the Japanese Patent Office on Jul. 23, 2004, the entire contents of which being incorporated herein by reference.

BACKGROUND OF THE INVENTION

1. Field of the Invention

The present invention relates to an infrared communication system and a remote control apparatus that use an infrared signal, in particular, to an infrared communication system and an infrared signal receiving apparatus that can be suitably used near a plasma display panel.

2. Description of the Related Art

When an electronic device such as audio-visual (AV) device, an air conditioner, and so forth are remotely controlled, infrared signals are used. For example, a remote control commander (hereinafter referred to as a remote controller) modulates a signal corresponding to a key input in a predetermined manner. A light emitting diode (LED) or the like of the remote commander converts the electric signal into an infrared signal. Thereafter, the remote controller transmits the infrared signal. In the reception side, a light reception device such as a photo diode receives the infrared signal and converts it into an electric signal. Thereafter, the reception side demodulates the received signal in a predetermined manner and obtains the control signal corresponding to the key input of the remote controller.

The infrared signals are also used to transmit not only signals of the remote controller, but also audio signals, image signals, and picture signals. For example, a headset system that wirelessly transmits an audio signal using an infrared signal has been practically used. A wireless microphone for a Karaoke device may use an infrared signal to wirelessly transmit an audio signal. In addition, when other electronic devices are remotely controlled, infrared signals may be used to perform television conversation and control small video cameras for security facilities.

In a regular remote controller, the transmission section uses an infrared signal whose peak is around 940 nm and the reception signal uses an infrared signal whose peak is around 875 nm to prevent them from mutually interfering.

In recent years, television receivers that have a large display screen and a thin housing have been desired. As products that satisfy them, television receivers that use a plasma display panel (hereinafter abbreviated as PDP) as a display device have been noticeably outspread. The PDP theoretically has two glass substrates on which transparent electrodes are formed and that are closely disposed. Inert gas such as argon or neon is filled in the glass substrates. By applying a high voltage to the inert gas, a plasma discharge takes place. The plasma discharge causes the inert gas to emit ultraviolet rays. By emitting the ultraviolet rays to predetermined phosphors, colors of red (R), green (G), and blue (B) are produced as full colors. The following non-patent document 1 describes an example of a television receiver that uses the PDP as a display device.

[Non-patent document 1] "FPD (Flat Panel Display) aiming at Television (translated title)," Nikkei Electronics Special Issue, Nikkei BP Corp., Oct. 25, 1999, pp. 93-104, Masaharu Tanaka, et. al.

SUMMARY OF THE INVENTION

It is known that the PDP emits near infrared rays as well as visible rays and that a predetermined wavelength of the near infrared rays has a peak level. Emission of the peak level of the near infrared rays may adversely affect the communication of the remote controller that uses infrared signals.

This situation will be described with reference to FIG. 1. A television receiver 100 uses the PDP as a display device. Rays are emitted from a display surface 100A of the television receiver 100. There is a device that has a light reception section 101. The light reception section 101 receives an infrared signal. The light reception section 101 is lined with the display surface 100A of the television receiver 100. In addition, there are furniture 102 and a user 103 in the same room of the television receiver 100.

In this situation, when a picture is displayed on the display surface 100A of the television receiver 100, visible rays of the picture are emitted from the display surface 100A. In addition, near infrared rays 110 whose predetermined wavelength has a sharp peak level are emitted from the display surface 100A. The rays 110 are reflected by for example the furniture 102. Reflected rays 110B of the furniture 102 may enter the light reception section 101. Likewise, the rays 110 are reflected by cloths and so forth of the user 103. Reflected rays 110A of the cloths and so forth of the user 103 may enter the light reception section 101. When reflectors are white, the reflected rays 110A and the reflected rays 110B that enter the light reception section 101 become strong.

The rays 110 are near infrared rays whose predetermined wavelength has a peak sensitivity of the light reception section. Thus, when the reflected rays 110A and 110B of the rays 110 enter the light reception section 101, it converts infrared signals of the entered rays into electric signals and demodulates these signals in the same manner as it does for infrared signals transmitted from a transmission section of the device. As a result, even if the remote controller does not transmit infrared signals to the light reception section 101, it outputs meaningless signals as control signals. As a result, a control object of the control signals may malfunction.

To solve this problem, a filter that attenuates the amount of light of near infrared rays having a predetermined wavelength is adhered to the display surface 100A of the PDP. This method of which the filter is adhered to the display surface 100A can technically fully restrain near infrared rays having a predetermined wavelength.

However, large television receivers that use the PDP as a display device have been desired for large sizes such as 42 inch size and 50 inch size. Thus, it is practically difficult to adhere a large filter on the entire display surface 100A of the television receiver 100 from a viewpoint of cost.

In addition, if the filter were adhered on the entire display surface 100A, the display quality would deteriorate.

In view of the foregoing, it would be desirable to provide an infrared communication system and an infrared signal receiving apparatus that restrain near infrared rays having a predetermined wavelength emitted by the PDP from affecting infrared communication.

According to an embodiment of the present invention, there is provided an infrared communication system having a transmitter and a receiver. The transmitter includes a modulator, a first converter, an infrared transmission section. The modulator modulates a first electric signal and generates a second signal as a modulated signal. The first converter converts the second signal into an infrared signal. The infrared transmission section transmits the infrared signal to the receiver. The receiver includes a filter, a second converter, and a demodulator. The filter restrains rays having a spectrum whose peak is present at a predetermined wavelength emitted by a plasma display panel. The second converter converts the infrared signal passed through the filter into a third electric signal. The demodulator demodulates the third electric signal.

According to an embodiment of the present invention, there is provided an infrared signal receiving apparatus that includes a filter, a converter, and a demodulator. The filter restrains rays having a spectrum whose peak is present at a predetermined wavelength emitted by a plasma display panel. The converter converts the infrared signal passed through the filter into an electric signal. The demodulator that demodulates the electric signal.

According to an embodiment of the present invention, since an optical filter that has a characteristic that restrains at least infrared rays whose predetermined wavelength has a peak intensity in rays emitted by the plasma display panel is disposed on the incident side of the light reception section of the light receiving apparatus for infrared signals, the near infrared rays emitted by the plasma display panel do not affect infrared communication.

At this point, it is not necessary to largely change the design of the light receiving apparatus for infrared signals.

In addition, since near infrared rays having a predetermined wavelength emitted by the plasma display panel do not adversely affect infrared communication, when the light receiving apparatus for infrared signals is used for electronic devices such as ART devices, air conditioners, and cameras that are remotely controlled and for light reception sections that transmit audio signals, image signals, and picture signals as infrared signals, these devices can be operated in the operational environment of the plasma display panel without influence of rays emitted therefrom.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawings, wherein similar reference numerals denote similar elements, in which.

DETAILED DESCRIPTION OF THE PREFERRED EMBODIMENTS

Figure 1:
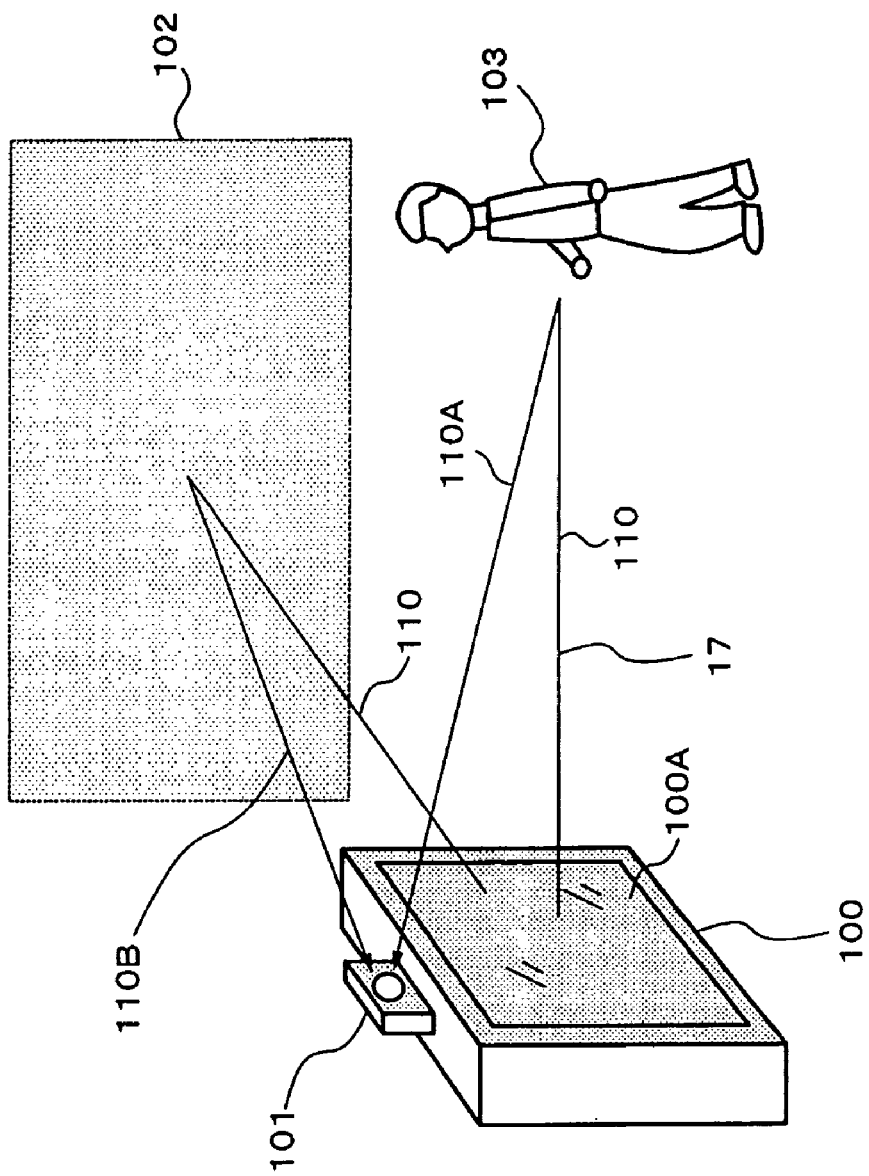
FIG. 1 is a schematic diagram describing a problem of an infrared communication system of related art.

Next, with reference to the accompanying drawings, a first embodiment of the present invention will be described. First, with reference to FIG. 2, an infrared communication system that remotely controls an object according to the first embodiment of the present invention will be briefly described. When a user 14 operates a remote control commander 1 (hereinafter referred to as the remote controller 1) in a predetermined manner, the remote controller 1 generates an infrared signal 3 corresponding to the operation and transmits the infrared signal 3 to a light reception section 2A of an infrared signal receiving apparatus 2. The light reception section 2A of the infrared signal receiving apparatus 2 converts the infrared signal 3 into a predetermined electric signal and supplies the electric signal to a display device 13 of a television receiver or the like. The operation of the display device 13 is controlled corresponding to an output of the infrared signal receiving apparatus 2. The output of the infrared signal receiving apparatus 2 corresponds to the infrared signal 3.

The remote controller 1 can perform for example the on/off operations of the power supply and adjustments of sound volume and picture quality of the display device 13. When the display device 13 is a television receiver, the remote controller 1 can select a reception channel.

When the display device 13 uses the PDP as a display device, near infrared rays having a predetermined wavelength emitted from the front surface of the display device 13 may be reflected by adjacent substances, user's cloths, and so forth. The reflected rays may reach the light reception section 2A of the infrared signal receiving apparatus 2.

Figure 3:
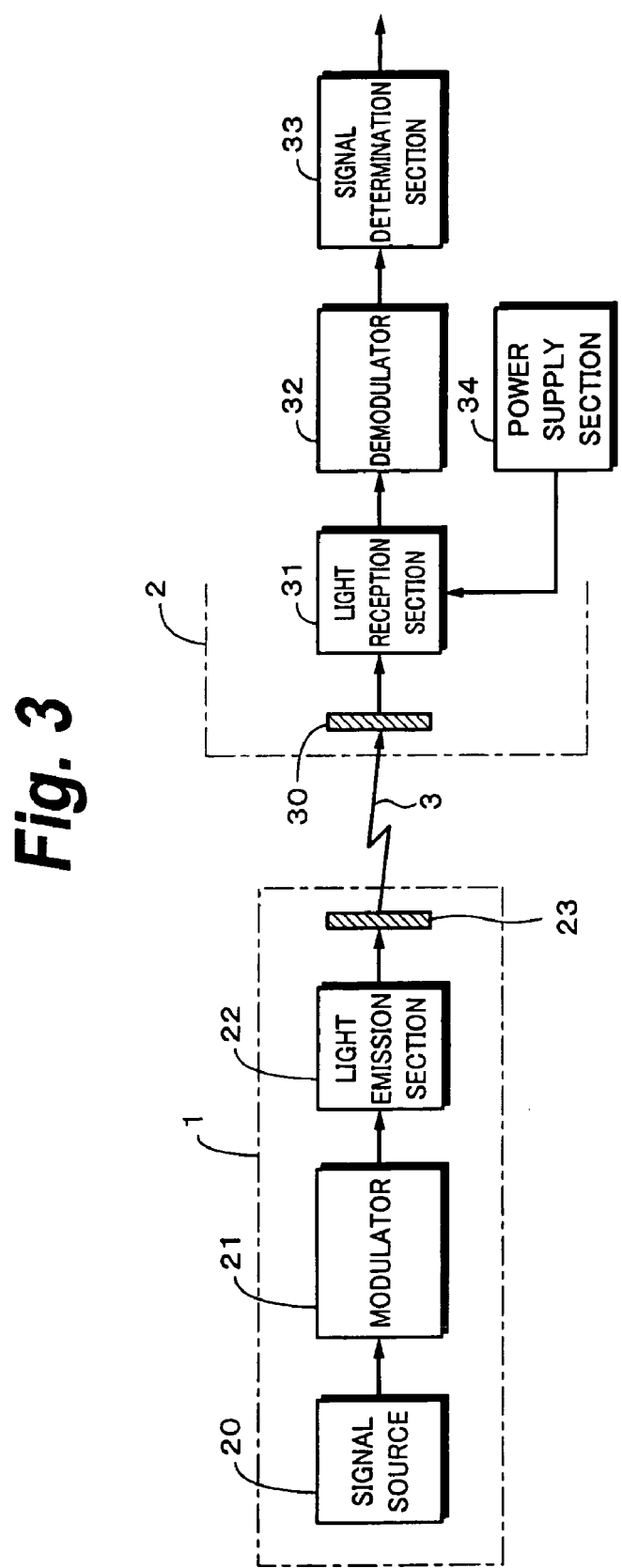
FIG. 3 is a block diagram more specifically showing the structure of a remote controller and an infrared signal receiving apparatus.

FIG. 3 more specifically shows the structure of the remote controller 1 and the infrared signal receiving apparatus 2. In the remote controller 1, a signal source 20 is for example a key input section composed of at least one operation key and a control section such as a microcomputer. The signal source 20 is not limited to this example. The signal source 20 may be for example another computer device. Instead, a device that outputs an audio signal and a video signal may be used as the signal source 20.

In the remote controller 1, the signal source 20 outputs a control signal corresponding to the operation of the operation key. The control signal is supplied from the signal source 20 to a modulator 21. The modulator 21 modulates the control signal in a predetermined manner and supplies the modulated signal to a light emission section 22. The light emission section 22 uses for example a light emission diode (LED) as a light emission device. The light emission section 22 outputs infrared rays having a wavelength corresponding to the input. The light emission section 22 converts the output of the modulator 21 into an infrared signal and transmits it as an infrared signal 3 to the outside of the remote controller 1 through a filter 23.

Figure 4:
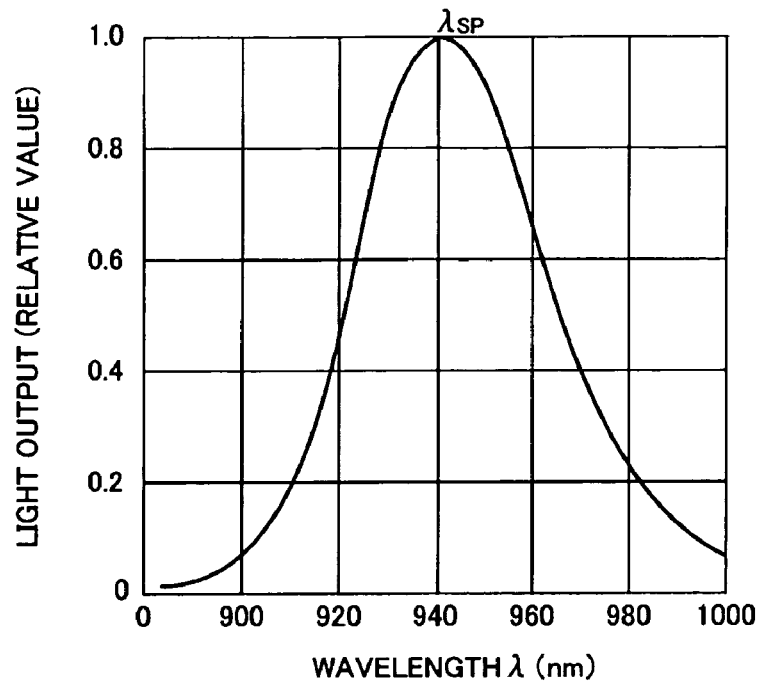
FIG. 4 is a schematic diagram showing an example of the spectrum distribution of rays emitted by a light emission section.

FIG. 4 shows an example of the spectrum distribution of rays emitted by the light emission section 22. In FIG. 4, the vertical axis represents a light output whose maximum value is normalized by 1, whereas the horizontal axis represents a wavelength (mn). As shown in FIG. 4, the light emission section 22 emits near infrared rays having a spectrum of which the peak level is present nearly at wavelength $\lambda_{SP}$=940 nm. According to the embodiment of the present invention, the light emission section 22 is a light emission device that emits rays that have as higher luminance at this wavelength as possible.

In the infrared signal receiving apparatus 2, a light reception section 31 receives the infrared signal 3 that is output from the remote controller 1 through a filter 30 that is a feature of the embodiment of the present invention. The light reception section 31 converts the received infrared signal 3 into an electric signal and supplies the electric signal to a demodulator 32. The demodulator 32 demodulates the electric signal and supplies the demodulated signal to a signal determination section 33. The signal determination section 33 performs a predetermined determination process corresponding to the supplied signal, identifies for example an original control signal, and outputs it.

Figure 5:
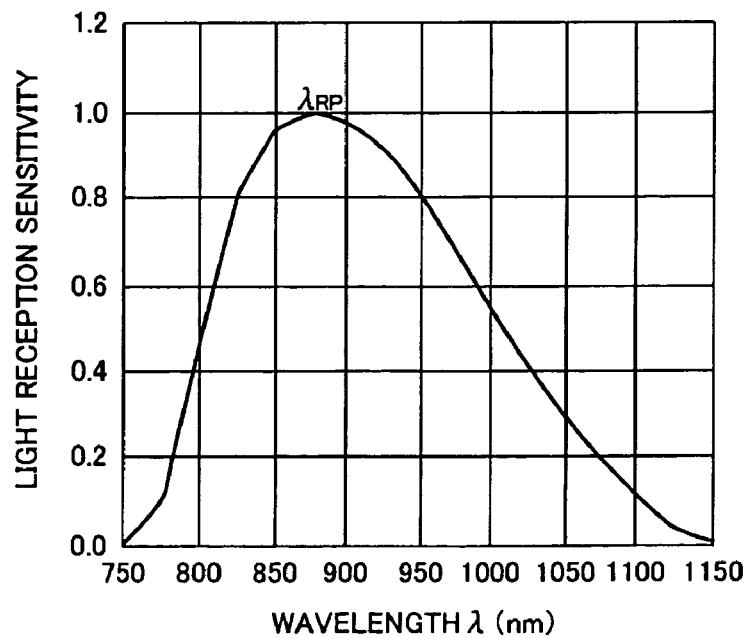
FIG. 5 is a schematic diagram showing an example of the wavelength dependency of the light reception sensitivity of the PDP.

The light reception section 31 uses for example a photo diode or a photo transistor as a light reception device. FIG. 5 shows an example of the wavelength dependency of the received light sensitivity of the light reception section 31. In FIG. 5, the vertical axis represents a received light sensitivity whose maximum light sensitivity is normalized by 1, whereas the horizontal axis represents a wavelength (nm). As shown in FIG. 5, the light reception section 31 has a peak sensitivity nearly at wavelength $\lambda_{RP}$=875 nm. The light reception section 31 controls the received light sensitivity corresponding to the voltage supplied from a power supply section 34. According to this embodiment of the present invention, the voltage supplied from the power supply section 34 to the light reception section 31 is controlled so that the light reception sensitivity is lower than the maximum light reception sensitivity.

Figure 6:
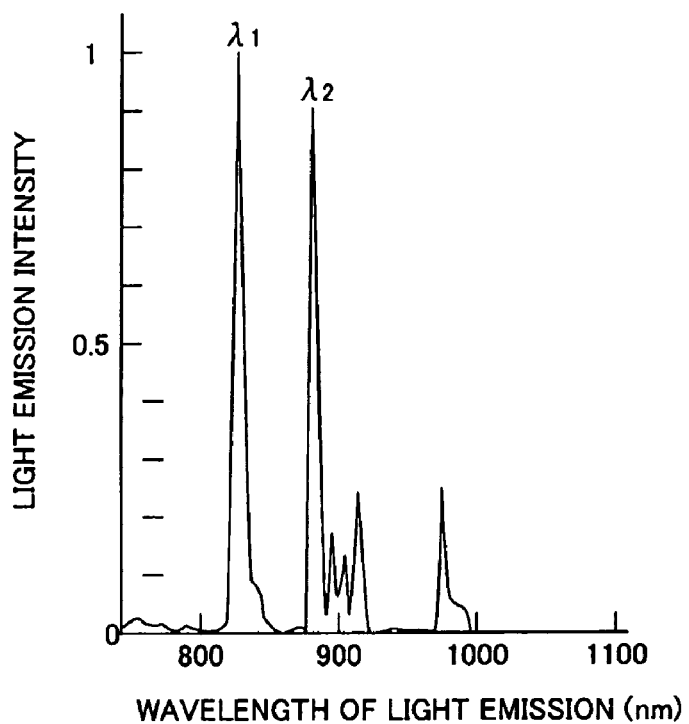
FIG. 6 is a schematic diagram mainly showing an example of the infrared region of the spectrum of rays emitted by the PDP.

According to this embodiment of the present invention, the filter 30 of the infrared signal receiving apparatus 2 restrains near infrared rays having a predetermined wavelength emitted by the PDP as described in the section "SUMMARY OF THE INVENTION." FIG. 6 mainly shows the infrared region of an example of the spectrum of rays emitted by the PDP. In FIG. 6, the vertical axis represents an intensity of a light emission whose maximum peak is normalized with 1, whereas the horizontal axis represents a wavelength. FIG. 6 shows that there are very strong peaks nearly at wavelengths of $\lambda_1$=825 nm and $\lambda_2$=880 nm of near infrared rays. These peaks of near infrared rays theoretically take place in the PDP.

On the other hand, as shown in FIG. 5, the light reception section 31 of the infrared signal receiving apparatus 2 has a peak of reception sensitivities at wavelength $\lambda_{RP}$=875 nm, which is very close to peaks of light intensities at wavelengths $\lambda_1$ and $\lambda_2$ (in particular, $\lambda_2$) of near infrared rays emitted by the PDP. Thus, the light reception section 31 sensitively reacts on near infrared rays emitted by the PDP.

On the other hand, as shown in FIG. 4, the light emission section 22 of the remote controller 1 has a peak of light emission intensities at wavelength $\lambda_{SP}$=940 nm, which is around 80% of the peak of reception sensitivities of the light reception section 31 and in a wavelength region of which there is no very strong peak of light emission intensities of rays emitted by the PDP (see FIG. 6). Thus, according to an embodiment of the present invention, when the characteristic of the filter 30 disposed on the incident side of the light reception section 31 of the infrared signal receiving apparatus 2 is properly set, the light reception section 31 can restrain rays having wavelengths $\lambda_1$ and $\lambda_2$ from being received. In addition, the light emission section 22 of the remote controller 1 can effectively receive rays having a spectrum whose peak of light emission intensities is present at wavelength $\lambda_{SP}$.

Figure 7:
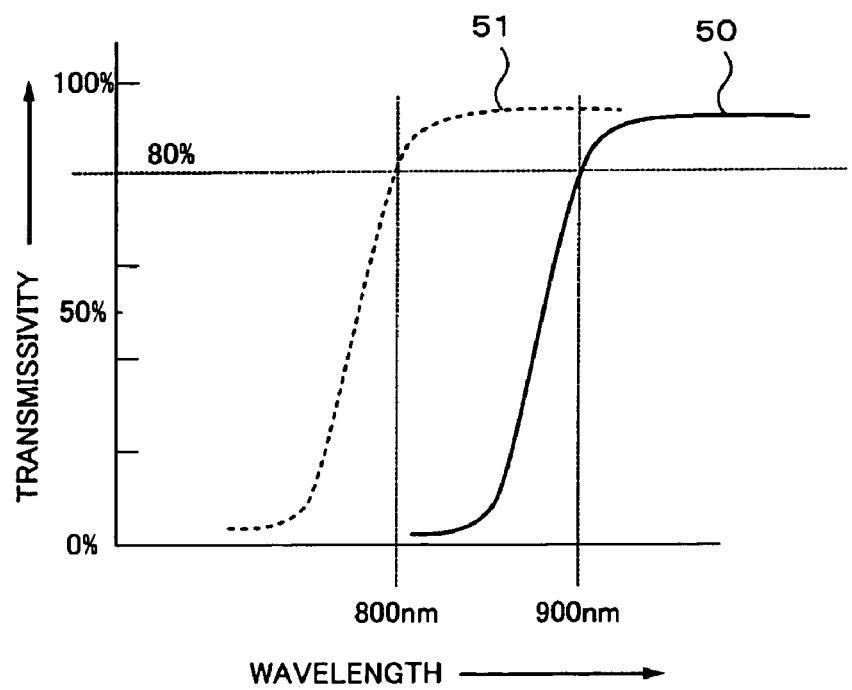
FIG. 7 is a schematic diagram showing a characteristic of a filter according to an embodiment of the present invention.

More specifically, as shown in FIG. 7, in the filter 30, a characteristic of which the transmissivity sharply drops at wavelength $\lambda_c$=900 nm or below is referred to as the characteristic 50. In the characteristic 50, as shown in FIG. 7, the transmissivity of the filter 30 is around 80% for rays having wavelength $\lambda_c$=900 nm. For rays having wavelengths in the range from $\lambda_c$=900 nm to $\lambda_{OFF}$=800 nm, the transmissivities thereof sharply drop with wavelength dependency. For rays having wavelengths $\lambda_{off}$=800 nm or less, the transmissivities thereof decrease to around 0% (for example, around ten percent to several percent or less).

Thus, the filter 30 has the characteristic 50 of which the attenuation amounts of near infrared rays having a spectrum whose very large peaks are present at wavelengths $\lambda_1$ and $\lambda_2$ become large and the attenuation amounts of rays having a spectrum whose peaks of light emission intensities are present for the light emission section 22 become small. The filter 30 having the characteristic 50 can be produced by layering a plurality of films having predetermined refractive indexes on for example a glass sheet.

The filter 30 having this characteristic can be obtained as TOYOLAC, grade 900FB181, Toray Industries. Inc.

A filter 30' that has a characteristic as shown in FIG. 6 has been used. In the filter 30', the transmissivity of rays having wavelength around $\lambda$=800 nm is 80% and the transmissivities of rays having wavelengths 800 nm or less sharply drop, namely rays in the infrared region are passed and rays in the visible region are not passed. However, the filter 30' cannot restrain near infrared rays that are emitted by the PDP and that have a spectrum whose peaks of light emission intensities are present at wavelengths $\lambda_1$ and $\lambda_2$.

According to the embodiment of the present invention, the filter 30 disposed on the incident side of the light reception section 31 of the infrared signal receiving apparatus 2 has the characteristic 50. In addition, the light reception section 31 is set so that the light reception sensitivity is lower than the maximum light reception sensitivity. Assuming that when the power supply voltage of the light reception section 31 is 5 V, the light reception sensitivity of the light reception section 31 becomes the maximum, the power supply section 34 supplies a power supply voltage of 3.0 V to 3.3 V to the light reception section 31.

Since the light reception sensitivity of the light reception section 31 is lower than the maximum light sensitivity, even if an infrared signal having wavelength $\lambda_c$=900 nm or lower, which has been attenuated by the filter 30, enters the light reception section 31, the infrared signal is detected in a lower level than the original level. In other words, when the light reception section 31 is set so that the light reception sensitivity is lower than the maximum light reception sensitivity, the characteristic 50 of the filter 30 can be effectively used.

According to the first embodiment of the present invention, since the filter 30, which restrains near infrared rays that have a spectrum whose very large peaks are present at wavelengths $\lambda_1$ and $\lambda_2$ from being received from the PDP, is disposed on the incident side of the light reception section 31 and the light reception section 31 is set so that the light reception sensitivity is lower than the maximum light sensitivity, the infrared signal receiving apparatus 2 can selectively receive an infrared signal that is output from the remote controller 1. Thus, the infrared signal receiving apparatus 2 can be prevented from malfunctioning against near infrared rays having predetermined wavelengths emitted by the PDP.

According to the first embodiment, the remote controller 1 controls the operation of the display device 13. However, it should be appreciated that the first embodiment is not limited to the foregoing example. In other words, the first embodiment of the present invention can be applied to an infrared communication system that uses the remote controller 1 to control for example an audio-video (AV) device. The AV device has a built-in infrared signal receiving apparatus 2. The infrared signal receiving apparatus 2 controls various operations of the AV device corresponding to the determined results of the signal determination section 33. The determined results of the signal determination section 33 correspond to the infrared signal 3.

In this case, when the display device 13 uses the PDP as a display device, near infrared rays having a predetermined wavelength emitted from the display surface of the display device 13 are reflected by surrounding substances and the cloths of the user 14. The reflected rays enter the light reception section 2A of the infrared signal receiving apparatus 2. Thus, the AV device may malfunction with the reflected rays. When the infrared communication system according to the first embodiment of the present invention is applied to the AV device, the infrared signal receiving apparatus 2 can selectively receive an infrared signal that is output from the remote controller 1 to prevent the AV device from malfunctioning against near infrared rays having a predetermined wavelength emitted by the PDP.

Figure 2:
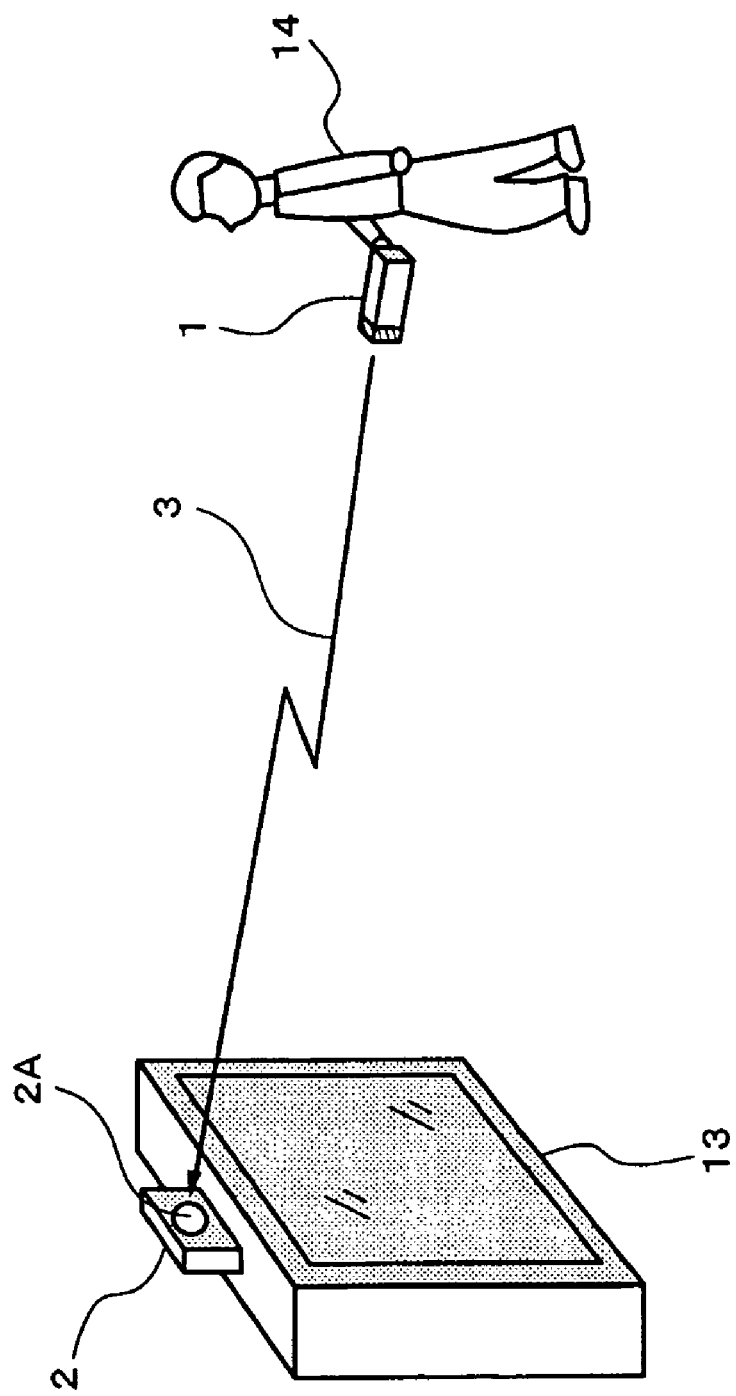
FIG. 2 is a schematic diagram showing an infrared communication system corresponding to a first embodiment of the present invention.
Figure 8:
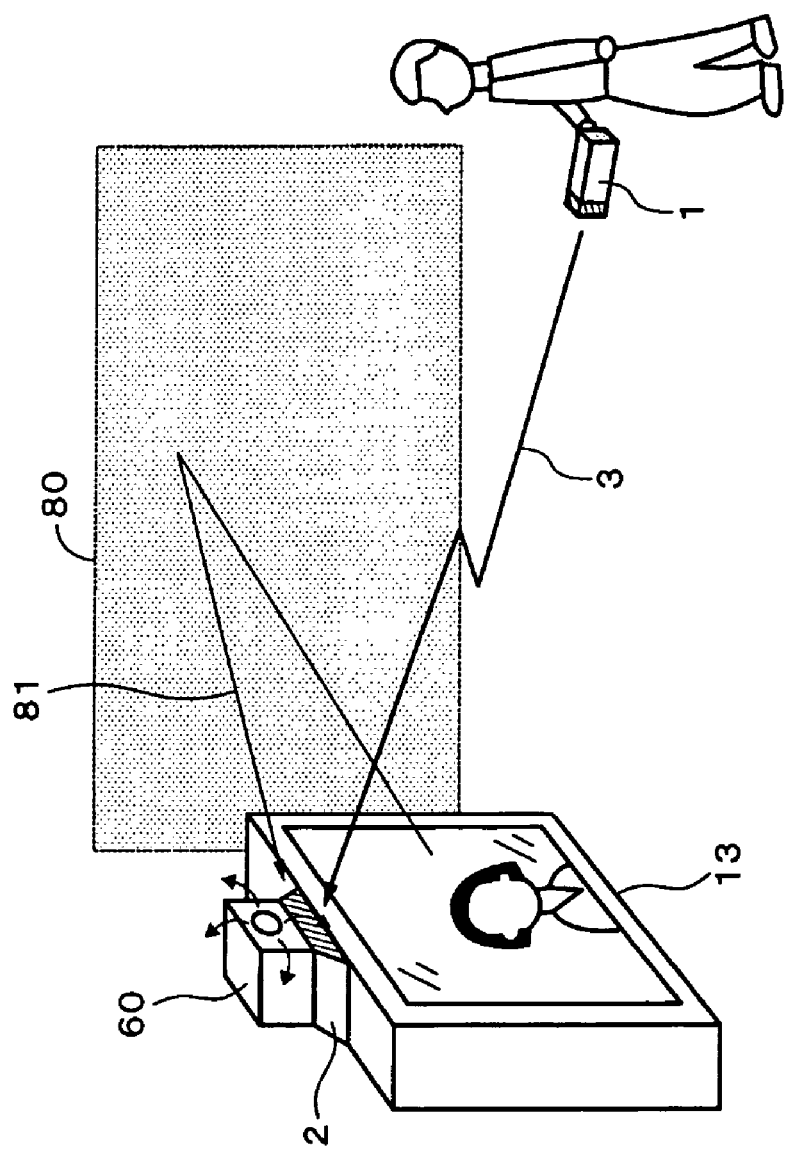
FIG. 8 is a schematic diagram describing a system according to a second embodiment of the present invention.
Figure 9:
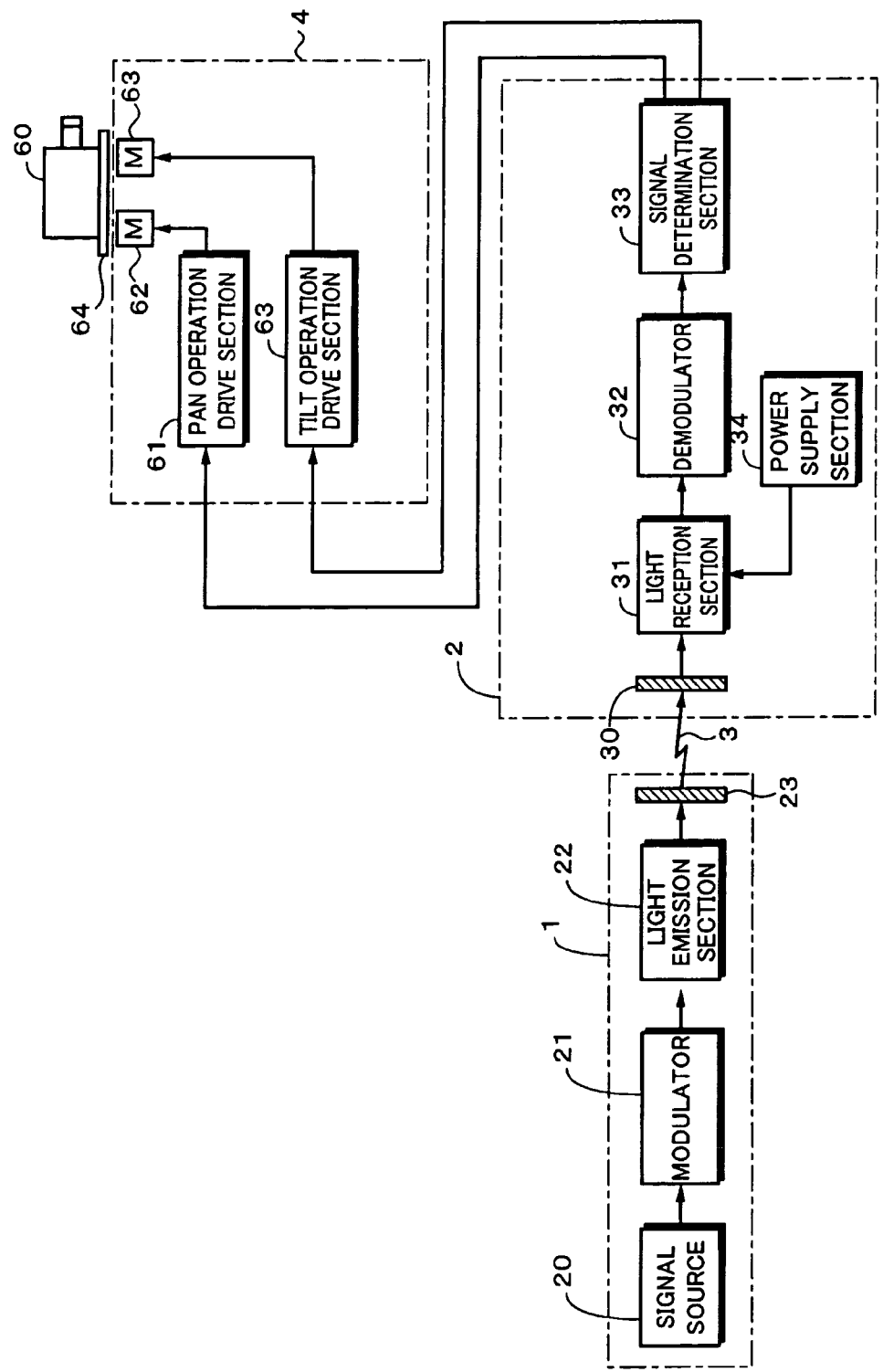
FIG. 9 is a block diagram showing an example of the structure of a remote controller, an infrared signal receiving apparatus, and a camera orientation control section according to the second embodiment of the present invention.

Next, with reference to FIGS. 8 and 9, a second embodiment of the present invention will be described. According to the second embodiment of the present invention, an infrared communication system is applied to a bidirectional picture communication system using a small camera 60. In FIG. 8 and FIG. 9, similar elements to those shown in FIGS. 2 and 3 are denoted by similar reference numerals and their description will be omitted.

According to the second embodiment of the present invention, as shown in FIG. 8, a small camera 60 is disposed near a display device 13. The small camera 60 can photograph a user and generate a photograph signal. The photograph signal of the small camera 60 is transmitted to a host device by a communication device (not shown). The host device side has the same system as the user side. As a result, the host device side and the user side can bidirectionally communicate pictures to each other.

The small camera 60 is mounted on a tripod head (not shown) that is upwardly, downwardly, leftward, and rightward rotatable. The operation of the tripod head is driven by a camera orientation control section 4. The camera orientation control section 4 is controlled corresponding to an output of a signal determination section 33 of an infrared signal receiving apparatus 2. Thus, the leftward and rightward rotations (pan) and upward and downward rotations (tilt) can be controlled by a remote controller 1. In other words, the photographing orientation of the small camera 60 can be remotely controlled by the remote controller 1.

FIG. 9 shows an example of the structure of the remote controller 1, the infrared signal receiving apparatus 2, and the camera orientation control section 4 according to the second embodiment of the present invention. A control signal that causes the orientation of the small camera 60 to be changed is generated by a signal source 20 corresponding to operations of orientation designation keys disposed on the remote controller 1. The control signal is modulated by a modulator 21 and the modulated signal is supplied to a light emission section 22. The light emission section 22 emits the modulated signal as an infrared signal 3 and transmits it to the infrared signal receiving apparatus 2 through a filter 23.

In the infrared signal receiving apparatus 2, the infrared signal 3 transmitted from the remote controller 1 enters a light reception section 31 through a filter 30 that has the same characteristic 50 shown in FIG. 5. The light reception section 31 is controlled with a voltage supplied from a power supply section 34 so that the light reception sensitivity is lower than the maximum light reception sensitivity as described above. The light reception section 31 converts the received infrared signal 3 into an electric signal and supplies the electric signal to a demodulator 32. The demodulator 32 demodulates the supplied electric signal and supplies the demodulated electric signal to the signal determination section 33. The signal determination section 33 performs a predetermined determination process corresponding to the supplied signal and determines the original control signal. The signal determination section 33 outputs a pan drive signal and a tilt drive signal corresponding to the determined result. The pan drive signal and the tilt drive signals cause the photographing orientation of the small camera 60 to be changed.

The pan drive signal and the tilt drive signal are supplied to a pan operation drive section 61 and a tilt operation drive section 65, respectively, of the camera orientation control section 4. The pan operation drive section 61 and the tilt operation drive section 65 drive a pan drive motor 62 and a tilt drive motor 63 corresponding to the supplied pan drive signal and tilt drive signal, respectively, so as to drive the rotations of a tripod head 64. The small camera 60 mounted on the tripod head 64 is panned and tilted by the pan drive motor 62 and the tilt drive motor 63, respectively, so as to control the photographing orientation of the small camera 60.

When the infrared communication system according to the second embodiment of the present invention is applied to the system that has the small camera 60 and the display device 13 that bidirectional communicate pictures to each other, near infrared rays having a predetermined wavelength emitted by the display device 13 can be restrained from entering the light reception section 31 of the infrared signal receiving apparatus 2. As shown in FIG. 8, reflected rays 81 reflected by a reflecting substance 80 are restrained from entering the light reception section 31 of the infrared signal receiving apparatus 2. Thus, the panning operation and the tilting operation of the small camera 60 can be prevented from malfunctioning against rays emitted by the display device 13.

Figure 10:
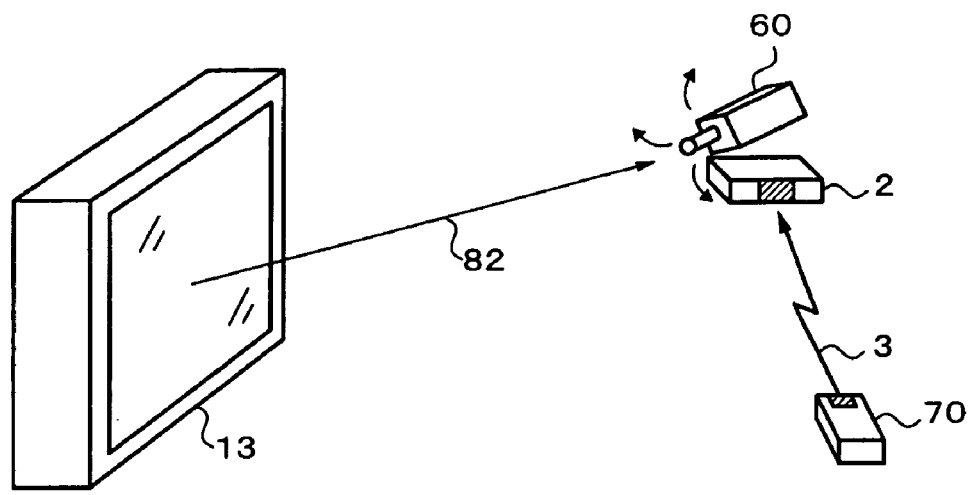
FIG. 10 is a schematic diagram describing a system according to a modification of the second embodiment of the present invention.

Next, with reference to FIG. 10, a modification of the second embodiment of the present invention will be described. According to this modification, the infrared communication system according to the second embodiment of the present invention is applied to a monitoring system that remotely controls or automatically monitors a device disposed in a room with cameras. In FIG. 10, similar elements to those in FIG. 2 and FIG. 8 are denoted by similar reference numerals and their description will be omitted.

In FIG. 10, a small camera 60 is mounted on a tripod head 64 (not shown) that is rotatable driven by a camera orientation control section 4 (not shown) in the same manner as the second embodiment. For example, the small camera 60 is installed at any position in a room. The camera orientation control section 4 is controlled corresponding to an output of a signal determination section 33 of an infrared signal receiving apparatus 2.

According to this modification of the second embodiment, an infrared signal 3 transmitted from a camera controller 70 corresponding to the remote controller 1 is received by the infrared signal receiving apparatus 2. The infrared signal receiving apparatus 2 controls the operation of the small camera 60 corresponding to the infrared signal 3. The camera controller 70 has a communication section having a connection function that connects itself to for example the Internet. The camera controller 70 outputs a control signal supplied from a signal source 20 to the communication section. The communication section transmits the control signal as an infrared signal 3. Instead, the camera controller 70 may automatically control the panning operation and the tilting operation of the small camera 60 corresponding to a program pre-installed thereto.

A photography signal of a picture photographed by the small camera 60 can be transmitted to the outside of the small camera 60 by the communication section of the camera controller 70. Of course, the photography signal may be supplied to a recording device such as a video cassette recorder (VCR) and recorded thereto. Instead, the photography signal may be supplied to the display device 13.

When the infrared communication system according to the embodiment of the present invention is applied to the camera control system that uses the small camera 60 that is remotely controlled with the infrared signal 3, near infrared rays 82 having a predetermined wavelength emitted by the display device 13 can be restrained from entering the light reception section 31 of the infrared signal receiving apparatus 2. Thus, even if the small camera 60 is installed at any position in the same room as the display device 13, the panning operation and the tilting operation of the small camera 60 can be prevented from malfunctioning against rays emitted by the display device 13.

Figure 11:
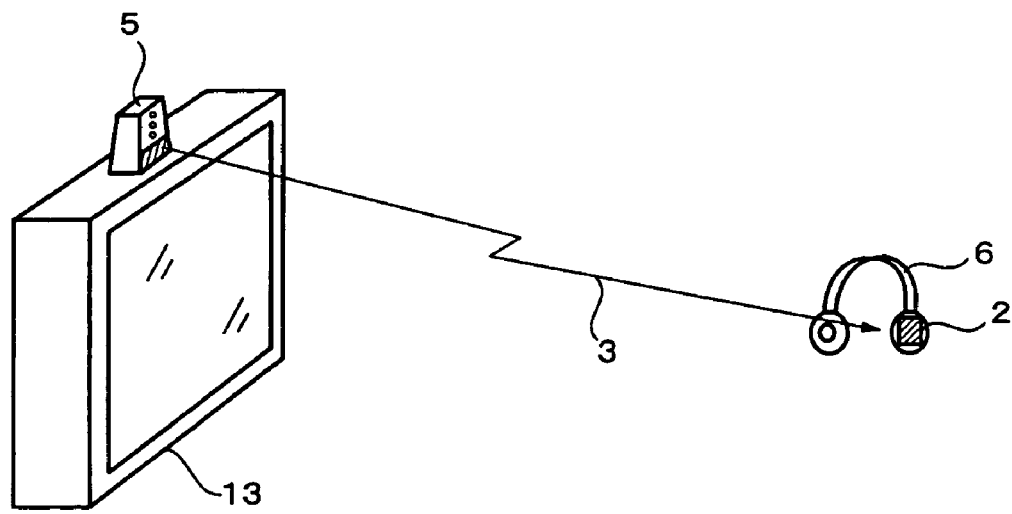
FIG. 11 is a schematic diagram describing a system according to a third embodiment of the present invention.

Next, with reference to FIG. 11, a third embodiment of the present invention will be described. According to the third embodiment, the foregoing infrared communication system is applied to a wireless headset system that has a transmitter 5 and a headset 6. The transmitter 5 modulates an audio signal with an infrared signal 3 and transmits the modulated signal. The headset 6 receives the infrared signal 3 from the transmitter 5 and reproduces audio sound. In FIG. 11, similar elements to those in FIG. 2 are denoted by similar reference numerals and their description will be omitted.

An audio signal corresponding to a picture displayed by a display device 13 for example the PDP is supplied to the transmitter 5. The transmitter 5 converts the supplied audio signal into a digital signal and compression-encodes the digital signal in a predetermined manner. The compression-encoded audio signal is modulated by a predetermined signal process. A light emission section converts the modulated signal into the infrared signal 3. The infrared signal 3 is transmitted to the headset 6.

On the other hand, the user wears the headset 6 and watches the display device 13. An infrared signal receiving apparatus 2 is built in the headset 6 the user is wearing. The infrared signal receiving apparatus 2 receives the infrared signal 3 transmitted from the transmitter 5. The infrared signal 3 is received through a filter 30 by a light reception section 31 whose light reception sensitivity has been controlled in a predetermined manner. The infrared signal 3 is converted into an electric signal and the electric signal is demodulated by a demodulator 32. The demodulator 32 obtains a digital signal that has been compression-encoded corresponding to a determined result of a signal determination section 33. An audio signal process section built in the headset 6 decodes the encoded signal and performs a predetermined process for the decoded signal. The decoded signal is amplified by an amplifier. The amplified signal is supplied to a speaker section of the headset 6.

In this system, unless countermeasures against near infrared rays having a predetermined wavelength emitted by the PDP are taken, the near infrared rays having the predetermined wavelength emitted by the PDP (display device 13) are directly received by the infrared signal receiving apparatus 2 built in the headset 6. As a result, the headset 6 cannot normally reproduce sound. However, when countermeasures against near infrared rays having a predetermined wavelength supplied by the PDP are taken by for example the filter 30 having the characteristic 50 and the light reception sensitivity of the light reception section 31 is controlled, the infrared signal receiving apparatus 2 of the headset 6 can selectively receive the infrared signal 3 transmitted from the transmitter 5 and normally reproduce sound.

The infrared communication systems according to the embodiments of the present invention can be applied to various communication systems that use infrared signals.

It should be understood by those skilled in the art that various modifications, combinations, sub-combinations and alternations may occur depending on design requirements and other factors insofar as they are within the scope of the appended claims or the equivalents thereof.

What is claimed is:

1. An infrared communication system, comprising:
   a transmitter including,
      a modulator configured to modulate a first electric signal and configured to generate a second signal as a modulated signal,
      a first converter configured to convert the second signal into an infrared signal, and
      an infrared transmission section configured to transmit the infrared signal to the receiver; and
   a receiver including,
      a filter configured to restrain a plurality of rays having a spectrum whose peak is present at a predetermined wavelength emitted by a plasma display panel,
      a second converter configured to detect a received infrared signal in accordance with a sensitivity, said sensitivity corresponding to a bias voltage, and configured to convert the received infrared signal into a third electric signal,
      a demodulator configured to demodulate the third electric signal, and
      a light-reception-sensitivity controller configured to supply the second converter with said bias voltage, said bias voltage being a predetermined value that is lower than a maximum bias voltage corresponding to a maximum second converter sensitivity, and said bias voltage being set independently of the received infrared signal.

2. The infrared communication system according to claim 1,
   wherein the first electric signal is a control signal relating to panning or tilting a camera.

3. The infrared communication system according to claim 1,
   wherein the filter is configured to restrain rays having wavelengths ranging between 800 nm and 900 nm.

4. The infrared communication system according to claim 1,
   wherein the filter has a transmissivity of 80% and greater for rays having wavelengths that are 900 nm and larger, a decreasing transmissivity for rays whose wavelengths range from 900 nm to 800 nm, and a transmissivity of 0% for rays having wavelengths that are smaller than 800 nm.

5. The infrared communication system according to claim 1, further comprising:
a camera that includes
a camera main body configured to photograph an object and configured to output a photography signals, and
a photographing orientation controller configured to control a photographing orientation of the camera main body,
wherein the first electric signal supplied to the modulator of the transmitter is a control signal configured to control the photographing orientation of the camera main body, and
wherein the photographing orientation controller is configured to control the photographing orientation of the camera main body based on the infrared signal received by the receiver.

6. An infrared signal receiving apparatus, comprising:
a filter configured to restrain a plurality of rays having a spectrum whose peak is present at a predetermined wavelength emitted by a plasma display panel;
a converter configured to detect a received infrared signal in accordance with a sensitivity, said sensitivity corresponding to a bias voltage, and configured to convert the infrared signal passed through the filter into an electric signal;
a demodulator configured to demodulate the electric signal, and
a light-reception-sensitivity controller configured to supply the second converter with said bias voltage, said bias voltage being a predetermined value that is lower than a maximum bias voltage corresponding to a maximum second converter sensitivity, and said bias voltage being set independently of the received infrared signal.

7. The infrared signal receiving apparatus according to claim 6,
wherein the filter is configured to restrain rays having wavelengths ranging between 800 nm and 900 nm.

8. The infrared signal receiving apparatus according to claim 6,
wherein the filter has a transmissivity of 80% and greater for rays having wavelengths that are 900 nm and larger, a decreasing transmissivity for rays whose wavelengths range from 900 nm to 800 nm, and a transmissivity of 0% for rays having wavelengths that are smaller than 800 nm.

9. The infrared signal receiving apparatus according to claim 6, further comprises:
a camera that includes
a camera main body configured to photograph an object and configured to output a photography signal, and
a photographing orientation controller configured to control a photographing orientation of the camera main body,
wherein the infrared signal is a control signal configured to control the photographing orientation of the camera main body, and
wherein the photographing orientation controller is configured to control the photographing orientation of the camera main body based on the infrared signal.

10. The infrared system according to claim 1, wherein the light-reception-sensitivity controller is a power supply, and said bias voltage is a power supply voltage.

11. The infrared receiving apparatus according to claim 6, wherein the light-reception-sensitivity controller is a power supply, and said bias voltage is a power supply voltage.

* * * * *